(12) United States Patent
Herrmann et al.

(10) Patent No.: US 6,590,007 B2
(45) Date of Patent: Jul. 8, 2003

(54) FLAME-RESISTANT HR COLD-MOULDED FOAM WITH REDUCED FUME DENSITY AND TOXICITY

(75) Inventors: Marc Herrmann, Leichlingen (DE); Peter Seifert, Lohmar (DE); Franz-Josef Bohne, Leichlingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/168,328

(22) PCT Filed: Dec. 12, 2000

(86) PCT No.: PCT/EP00/12593

§ 371 (c)(1),
(2), (4) Date: Jun. 20, 2002

(87) PCT Pub. No.: WO01/48047

PCT Pub. Date: Jul. 5, 2001

(65) Prior Publication Data

US 2003/0045593 A1 Mar. 6, 2003

(30) Foreign Application Priority Data

Dec. 23, 1999 (DE) .......................... 199 62 911

(51) Int. Cl.[7] .............................. C08G 18/10
(52) U.S. Cl. .................. 521/137; 521/128; 521/134; 521/170; 521/174
(58) Field of Search ................. 521/128, 134, 521/137, 170, 174

(56) References Cited

U.S. PATENT DOCUMENTS

| | | | |
|---|---|---|---|
| 4,977,194 A | 12/1990 | Haas et al. | 521/99 |
| 5,739,173 A | 4/1998 | Lutter et al. | 521/99 |
| 5,741,827 A | 4/1998 | Chakrabarti et al. | 521/121 |
| 5,977,198 A | 11/1999 | Hettel et al. | 521/174 |
| 6,034,146 A | 3/2000 | Falke et al. | 521/128 |
| 6,059,990 A | 5/2000 | Falke et al. | 252/182.24 |
| 6,103,140 A | 8/2000 | Falke et al. | 252/182.26 |
| 6,201,035 B1 * | 3/2001 | Tuinman et al. | 521/174 |

FOREIGN PATENT DOCUMENTS

| | | |
|---|---|---|
| DE | 40 05 373 | 8/1991 |
| DE | 197 07 577 | 8/1998 |

OTHER PUBLICATIONS

Journal of Cellular Plastics, Bd. 29, Nr. 1, Feb. 1993 (1993–02), Seiten 43–56, XP000345190 Lancaster, US das ganze Dokument.

Polyurethane World Congress 1991, Technomic Publishing, Basel, Lancaster, Sep. 24–26, 1991, pp. 615–619, "The Ignition Behaviour of Conventional and HR Foams, Particularly in Relation to Small Ignition Sources", P. F. Haas and F. H. Prager.

* cited by examiner

Primary Examiner—John M. Cooney, Jr.
(74) Attorney, Agent, or Firm—Joseph C. Gil; N. Denise Brown

(57) ABSTRACT

The invention relates to flame-resistant HR cold-cure moulded foams with reduced smoke intensity and toxicity, a process for the preparation thereof and the use thereof.

5 Claims, No Drawings

FLAME-RESISTANT HR COLD-MOULDED FOAM WITH REDUCED FUME DENSITY AND TOXICITY

BACKGROUND OF THE INVENTION

The invention relates to flame-resistant HR cold-cure moulded foams with reduced smoke intensity and toxicity, a process for the preparation thereof and the use thereof.

Cold-curing polyurethane flexible moulded foams are used, inter alia, as seats, back and arm rests or head rests in automobiles, track vehicles and water-craft, aeroplanes and in the furniture sector. In all the above-mentioned sectors, the flame resistance of the foams is an important factor. The requirements in respect of flame resistance are very stringent in the case of track vehicles, aeroplanes and furniture in particular. In order to meet the relevant standards, such as, e.g., BS 5852, Part 2, Crib Ignition Source V, CSE RF4/83 or UIC 564/2 or and DIN 54341, ASTM E 162; California TB 133, melamine is added to the foam as a flame retardant. A disadvantage of this is that a solid has to be stirred into the polyol formulation with the development of dust. Moreover, the melamine solid settles out of the polyol formulation, making processing difficult. The sedimentation of melamine may be prevented by the use of specially stabilised melamine dispersions in polyethers, as described in DE-OS 195 40 809 and EP-A 835 905. Moreover, the mechanical properties of the foams, particularly the tensile strength, elongation at break and tear propagation resistance are adversely affected by the incorporation of melamine in the polymer matrix of the foam. A further disadvantage is that high smoke intensities and toxicities occur during combustion.

It follows from "Polyurethanes World Congress 1991", Technomic Publishing, Basel, Lancaster 1991, p. 615 ff that flame-resistant HR slabstock foams can be obtained by the combination of pure toluene diisocyanate with a PHD polyol and liquid phosphorus halogen compounds. An HR cold-cure moulded foam produced with these components does not, however, meet the requirements laid down in BS 5852 Part 2, Crib V, this possibly being attributable to the different polymer structure in slabstock foam and moulded foam. The results obtained on slabstock foam cannot, therefore, be transferred to moulded foam.

It has now been found that by reacting mixtures of TDI and MDI with PHD or PIPA polymer polyols, it is possible to obtain HR cold-cure moulded foams with reduced flammability, smoke density and toxicity.

SUMMARY OF THE INVENTION

The invention provides, therefore, an HR cold-cure moulded foam which may be obtained by reacting
a) mixtures of TDI and MDI in the weight ratio 95:5 to 60:40 with
b) dispersions of polymers containing relatively high molecular weight hydroxyl compounds which were prepared by reacting mono- and/or polyisocyanates with polyamines and/or hydrazines and/or hydrazides and/or alkanolamines having primary and/or secondary amino groups in a polyether having 1 to 8 primary and/or secondary hydroxyl groups with a number-average molecular weight from 400 to 16000,
c) in the presence of chemical and/or physical blowing agents (specially water), and
d) optionally flame retardants which are liquid and/or soluble in a), b) or c), and/or
e) optionally compounds with at least two hydrogen atoms which are reactive towards isocyanates and with a molecular weight from 32 to 399, and/or
f) optionally further auxiliaries.

According to the invention, mixtures of toluene diisocyanate (TDI) and diphenylmethane diisocyanate (MD) are used as component a). The weight ratio between TDI and MDI is 95:5 to 60:40, preferably 95:5 to 70:30, particularly preferably 95:5 to 80:20. The isomer ratio of 2,4-TDI to 2,6-TDI may be from 100:0 to 65:35. In the MDI used, the content of binuclear diisocyanates, i.e. 2,2'-MDI, 2,4'-MDI and 4,4'-MDI is preferably between 35 and 100 wt. %, wherein 2,4'-MDI accounts for a proportion from 0 to 60 wt. % of the total amount of MDI. Higher homologues of the mixtures containing the MDI series ("polymeric MDI", "crude MDI") may also be used. According to the invention, both TDI and MDI may be modified in a manner known to the expert, as described in G. Oertel (ed.): "Kunststoff-Handbuch", Vol, VII, Carl Hanser Verlag, 3rd edition, Munich 1993, p. 91–97, i.e., for example, to form an allophanate, biuret, trimer, carbodiimide, or prepolymerised with polyethers or parts of component b). If mixtures are used in which an isocyanate component is modified with polyethers or parts of component b), then the weight ratio of TDI to MDI is calculated on the basis of the unmodified isocyanates.

According to the invention, the polyol component b) contains dispersions of polymers containing relatively high molecular weight hydroxyl compounds which were prepared by reacting mono- and/or polyisocyanates with polyamines and/or hydrazines and/or hydrazides and/or alkanolamines having primary and/or secondary amino groups in a polyether having 1 to 8 primary and/or secondary hydroxyl groups with a number-average molecular weight from 400 to 16000 ("base polyol"). Base polyols with a number-average molecular weight from 1500 to 8000 are used in preference. Hydroxyl compounds used in preference are those which were prepared by reacting polyether polyols with hydrazines (PHD polyols). The component b) preferably has an average OH functionality from 2.0 to 3.5. Polyether polyols used in preference are those which have a primary OH group content of at least 60 mole %, preferably at least 70 mole %. In a further preferred embodiment, the component preferably contains, in addition to a base polyol with an ethylene oxide content of at most 40 wt. %, at least one other polyether polyol with an average functionality from 2 to 6, a number-average molecular weight from 1500 to 12000 in an amount from 1 to 50 wt. %, based on the total amount of compound b) with an EO content of more than 40 wt. %. This embodiment leads to better skin formation, a greater open-cell character and allows more scope for adjusting the NCO/OH index and hence better processability of the formulation. The foam obtained has increased elasticity and its hardness, which may be high due to the polymer dispersion, is reduced to such an extent that even flexible moulded parts may be produced.

Chemical and/or physical blowing agents c) are used for the preparation of the foams according to the invention. The chemical blowing agent used as component c) is preferably water which yields carbon dioxide as blowing gas by reaction with isocyanate groups. Water is used preferably in an amount from 2 to 8 wt. %, particularly preferably 2 to 4 wt. %, based on the amount of component b). Carbon dioxide may, however, also be added to the polyol or isocyanate component as a gas or in the liquid form, online or in the batch process according to inherently known methods. In component c) it is also possible to use nonflammable physical blowing agents such as, e.g., dichloromethane, dichloromonofluoromethane, difluoromethane, trifluoromethane, difluoroethane, 1,1,1,2-tetrafluoroethane, tetrafluoroethane (R 134 or R 134a), 1,1,1,3,3,3-hexafluoropropane (R 356), 1,1,1,3,3-pentafluoropropane (R 245fa), chlorodifluoroethane, 1,1-dichloro-2,2,2-trifluoroethane, 2,2-dichloro-2-fluoroethane, heptafluoropropane and sulfur hexafluoride. Mixtures of said blowing agents may also be used. As the blowing agent escapes almost completely from the foam during the production process, low-boiling hydrocarbons, e.g., pentane, hexane and isomers thereof may also be used. Other suitable blowing agents are carboxylic acids such as formic acid, acetic acid, oxalic acid and chemical blowing agents which liberate gases during the foaming process, such as, e.g., carbamates. These blowing agents are used preferably in combination with water.

Optionally, liquid flame retardants d) which are liquid and/or soluble in one or more of components a), b) or c) are used for the preparation of the foams according to the invention. Commercial flame retardants containing phosphorus are used in preference, for example, tricresyl phosphate, tris-(2-chloroethyl) phosphate, tris-(2-chloropropyl) phosphate, tris-(2,3-dibromopropyl) phosphate, tris-(1,3-dichloropropyl) phosphate, tetrakis-(2-chloroethyl) ethylene diphosphate, dimethylmethane phosphonate, diethylethane phosphonate, diethanolaminomethylphosphonic acid diethyl ester. Halogen- and/or phosphorus-containing polyols with a flame retardant effect are also suitable. The flame retardants are used preferably in an amount of at most 35 wt. %, preferably at most 20 wt. %, based on component b).

Compounds with at least two hydrogen atoms which are reactive towards isocyanates and with a molecular weight from 32 to 399 e) are also optionally used in the preparation of the foams according to the invention. These are taken to mean compounds having hydroxyl groups and/or amino groups and/or thiol groups and/or carboxyl groups, preferably compounds having hydroxyl groups and/or amino groups, which act as chain extenders or crosslinking agents. Said compounds generally have 2 to 8, preferably 2 to 4 hydrogen atoms which are reactive towards isocyanates. Examples thereof are described in DE-OS 28 32 253, p.10–20. In a preferred embodiment, mixtures of at least two of these chain extenders and/or crosslinking agents are used. Preferred chain extenders and/or crosslinking agents are, for example, glycerol, ethylene glycol, diethanolamine, triethanolamine and triisopropanolamine.

Optionally other auxiliaries and additives f) may also be used in the preparation of the HR cold-cure moulded foams according to the invention. These are, for example, catalysts which accelerate the reaction between the isocyanate component a) and the polyol component b). Examples of suitable catalysts are organic tin compounds such as tin (II) salts of organic carboxylic acids, e.g., tin (II) acetate, tin (II) octoate, tin (II) ethyl hexanoate and tin (II) laurate and the dialkyltin (IV) salts, e.g., dibutyltin diacetate, dibutyltin dilaurate and dioctyltin diacetate. Other examples of suitable catalysts are amines such as dimethylaminopropyl urea, dimethylaninopropylamine, bis(dimethylaminopropyl) amine, diazabicyclooctane, dimethylethanolamine, triethylamine, dimethylcyclohexylamine, dimethylbenzylamine, pentamethyldiethylene triamine, N,N,N',N'-tetramethylbutane diamine, N-methylmorpholine, bis(dimethylaminoethyl)ether and tris (dialkylaminoalkyl)-s-hexahydrotriazines. The catalyst component contains preferably at least one aliphatic amine.

A combination of several catalysts may also be used. It is also possible to use, for example, paraffins or fatty alcohols or dimethyl polysiloxanes, and pigments or dyes, and stabilisers against ageing and weathering influences, plasticisers such as dioctyl phthalate and fungistatic and bacteriostatic substances. These are usually added to the polyol component in amounts from 0 to 10 parts by weight, preferably 0 to 5 parts by weight. Other examples of surfactant additives and foam stabilisers and cell regulators, reaction inhibitors, stabilisers, flame-retardant substances, dyes and fungistatic and bacteriostatic substances which may also optionally be used, and details about the mode of use and mode of action of said additives are described in G. Oertel (ed.), "Kunststoff-Handbuch", Vol. VII, Carl Hanser Verlag, 3rd edition, Munich 1993, p.110–115 and DE-OS 27 32 292.

The reaction components are usually reacted according to the inherently known one-stage process, the prepolymer process or the semi-prepolymer process, mechanical equipment often being used, e.g. that described in U.S. Pat. No. 2,764,565. Details about processing equipment which is also suitable according to the invention are described in R. Vieweg, A. Höchtlen (ed.): "Kunststoff-Handbuch", Vol. VII, Carl-Hanser Verlag, Munich 1966, p. 121–205. According to the invention, foaming is carried out preferably in closed moulds. The reaction mixture is introduced into a mould. Suitable mould material includes metal, e.g. aluminium or plastic, e.g. epoxy resin. The expandable reaction mixture foams in the mould and forms the moulded article. According to the invention, a suitable procedure in this connection is to introduce expandable reaction mixture into the mould in such an amount that the foam formed just fills the mould. It is also possible, however, to operate such that more expandable reaction mixture than is required to fill up the inside of the mould with foam is introduced into the mould. In the latter case, operations are carried out with "over-charging"; such a mode of operation is known, e.g., from U.S. Pat. Nos. 3,178,490 and 3,182,104.

The preparation of the foams according to the invention is carried out preferably in such a way that the NCO/OH index, i.e. the stoichiometric ratio between reactive isocyanate groups and hydroxyl groups multiplied by 100, is between 65 and 120. The NCO/OH index is particularly preferably 70 to 110.

The density of the moulded articles obtained is preferably 30 to 120 kg/m$^3$. In a preferred embodiment of the invention, the ratio of components is selected such that the filler content of the foam formulation, i.e., the proportion of dispersed polymer components contained in component b) to the total amount of foam formulation, is 3 to 30 wt. %, preferably 4 to 16 wt. %.

The invention also provides the use of the foams according to the invention as upholstery material for, e.g., seats, back and arm rests and head rests in automobiles, track vehicles, aeroplanes and water-craft and in furniture for private and public uses.

EXAMPLES

The following abbreviations are used below:
Polyol A: Polyether triol, OH value 28, EO content about 13.5 wt. %, filled with 20 wt. % of polyurea dispersion (Desmophen® 7619 from Bayer AG)
Polyol B: Polyether triol, OH value 28, EO content about 13.5 wt. %, filled with 20 wt. % of styrene-acrylonitrile polymer
(Bayfit® 3699 from Bayer AG)
Polyol C: Polyether polyol PIPA, preparation see below Polyol D: Polyether triol, OH value 28, EO content about 13.5 wt. %
Polyol E: Polyether diol, OH value 28, EO content about 13.5 wt. %
Polyol F: Polyether triol, OH value 37, EO content about 85 wt. %
Polyol G: Polyether diol, OH value 56, EO content about 50 wt. %
Isocyanate 1: TDI with 80% of the 2,4-isomer (Desmodur® T80 from Bayer AG)
Isocyanate 2: Polymeric MDI with an NCO content of 31.5 wt. %
(Desmodur® 44V20 from Bayer AG)
Isocyanate 3: Modified TDI (biuret) with an NCO content of 42 wt. %
Isocyanate 4: Modified TDI (biuret) with an NCO content of 37 wt. %
Isocyanate 5: TDI with about 100% of the 2,4-isomer (Desmodur® T100 from Bayer AG)
Isocyanate 6: Modified MDI (isocyanate 7 prepolymerised with polyol G) with an NCO content about. 26 wt. %
Isocyanate 7: MDI with a binuclear proportion of about 100%, of which 53% is 2,4'-MDI, NCO content about 33.5 wt. %
Isocyanate 8: MDI modified with a hexafunctional polyether having an OH value of 28 with a binuclear content of 85 wt. % and a 2,4'-MDI content of about 24 wt. %, NCO content 25 wt. %
L 3200: Foam stabiliser (Niax® Silicone L 3200, Witco Surfactants GmbH, D-36396 Steinau)
L 3100: Foam stabiliser (Niax® Silicone L 3100, Witco Surfactants GmbH, D-36396 Steinau)
L 3002: Foam stabiliser (Niax® Silicone L 3002, Witco Surfactants GmbH, D-36396 Steinau)
B 4690: Foam stabiliser (Tegostab® B 4690, Th. Goldschmidt AG, D-45127 Essen)
A1: Bis(dimethylaminoethyl)ether, 70% in dipropylene glycol (Niax® Catalyst A1, Witco Surfactants GmbH, D-36396 Steinau)
DMAPA: Dimethylaminopropylamine
33 LV: Dabco® 33 LV, diazabicyclooctane 33% in dipropylene glycol (Air Products GmbH, D-45527 Hattingen)
TCPP: Tris(2-chloropropylphosphate) (Levagard® PP from Bayer AG)
DABCO® 8154: Amine catalyst (Air Products GmbH, D-45527 Hattingen)
TEA: Triethylamine Preparation of Polyol C 90 parts by wt. of a polyether triol (OH value 35, EO content about 13.5 wt. %) were intensively mixed with 5 parts by wt. of triethanolamine at room temperature. Then 5 parts by wt. of TDI 80 were added to the mixture, with homogenisation. The initially clear mixture became cloudy due to the fine-particle precipitation of the polymer dispersion. After 12 h heating at 50° C. followed by cooling to room temperature, the polymer dispersion could be processed further. The OH value was about 57, the filler content about 10 wt. %.

Preparation of the Foams:

The ratio figures given in the tables relate to parts by weight of the corresponding components.

The polyol formulation was prepared by mixing the corresponding parts by wt. of the individual components and was intensively mixed with the corresponding parts by wt. of the isocyanate (Example 1 to 22) or processed by means of a high pressure plant (Example 23 to 31). The reaction mixture was introduced into an aluminium mould pre-heated to 40° C., the mould was closed with an aluminium cover and the reaction mixture was left to foam. After 7 minutes the foams were removed from the mould.

Table 1:

The foams prepared with an SAN-filled polyol or base polyol (comparison example 1 and 2) using a mixture of TDI and MDI went up in flames in the flammability test and had to be extinguished. The foams according to the invention (Examples 3 and 4) passed the test. Comparison example 5 based on modified MDI and comparison example 6 based on a TDI-MDI mixture in a ratio of 40:60 had to be extinguished.

TABLE 1

Flammability test to BS 5852, Part 2, Crib Ignition Source V

| | Example 1 Comparison | Example 2 Comparison | Example 3 | Example 4 | Example 5 Comparison | Example 6 Comparison |
|---|---|---|---|---|---|---|
| POLYOL FORMULATION | | | | | | |
| Polyol A | | | 70 | | 80 | 70 |
| Polyol B | 87 | | | | | |
| Polyol C | | | | 87 | | |
| Polyol D | | 100 | | | | |
| Polyol E | 13 | | 30 | 13 | 20 | 30 |
| TCPP | 20 | 20 | 20 | 20 | 20 | 20 |
| Water | 3 | 3 | 3.35 | 3 | 3 | 3.35 |
| A 1 | 0.05 | 0.05 | 0.05 | 0.05 | 0.17 | 0.05 |
| DMAPA | 0.3 | 0.3 | 0.3 | 0.3 | 0.3 | 0.3 |
| 33 LV | 0.3 | 0.3 | 0.3 | 0.3 | 0.22 | 0.4 |
| L 3200 | 0.7 | 0.7 | 0.7 | | | |
| L 3100 | | | | 0.7 | 0.6 | 0.7 |
| L 3002 | 0.5 | 0.5 | 0.5 | 0.5 | 0.45 | 0.5 |
| Glycerol | 0.3 | 0.3 | 0.3 | 0.3 | 0.25 | 0.3 |
| Isocyanate 1 | 30.56 | 30.56 | 30.56 | | | 16.91 |
| Isocyanate 2 | 7.64 | 7.64 | 7.64 | 1.92 | | 25.37 |
| Isocyanate 3 | | | | 36.39 | | |
| Isocyanate 8 | | | | | 55.50 | |

TABLE 1-continued

Flammability test to BS 5852, Part 2, Crib Ignition Source V

|  | Example 1 Comparison | Example 2 Comparison | Example 3 | Example 4 | Example 5 Comparison | Example 6 Comparison |
|---|---|---|---|---|---|---|
| Index | 95 | 95 | 93 | 85 | 95 | 87 |
| Density (g/l) of moulded part | 55 | 55 | 55 | 55 | 65 | 51 |
| BS 5852 Crib V | Not passed | Not passed | Passed | Passed | Not passed | Not passed |
| Weight loss (g) |  |  | 42 | 38 |  |  |

Table 2:
  The foams prepared with the polyol formulation according to the invention and the MDI-TDI mixtures according to the invention passed the flammability test.

TABLE 2

Flammability test to BS 5852, Part 2, Crib Ignition Source V

|  | Example 7 | Example 8 | Example 9 | Example 10 | Example 11 | Example 12 | Example 13 |
|---|---|---|---|---|---|---|---|
| POLYOL FORMULAT | | | | | | | |
| Polyol A | 70 | 70 | 70 | 70 | 70 | 70 | 80 |
| Polyol D | 30 | 30 | 30 | 30 | 30 | 30 |  |
| Polyol E |  |  |  |  |  |  | 20 |
| TCPP | 15 | 15 | 15 | 20 | 10 | 20 | 20 |
| Dabco 8154 |  |  |  |  |  |  | 0.6 |
| TEA |  |  |  |  |  |  | 0.2 |
| Water | 3.35 | 3.35 | 3.35 | 3.35 | 3.35 | 3.35 | 3.40 |
| A1 | 0.05 | 0.05 | 0.05 | 0.05 | 0.05 | 0.05 |  |
| DMAPA | 0.3 | 0.3 | 0.3 | 0.3 | 0.3 | 0.3 | 0.4 |
| 33 LV | 0.3 | 0.3 | 0.3 | 0.3 | 0.3 | 0.3 |  |
| L 3100 | 0.7 | 0.7 | 0.7 | 0.7 | 0.7 | 0.7 | 0.7 |
| L 3002 | 0.5 | 0.5 | 0.5 | 0.5 | 0.5 | 0.5 | 0.7 |
| Glycerol | 0.3 | 0.3 | 0.3 | 0.3 | 0.3 | 0.3 | 0.3 |
| Isocyanate 1 | 19.98 | 16.47 | 11.22 |  | 9.84 | 15.12 | 29.02 |
| Isocyanate 2 | 4.44 | 3.66 | 3.74 | 3.92 | 4.1 | 7.56 |  |
| Isocyanate 3 | 19.98 | 16.47 | 22.44 | 35.28 |  | 15.12 |  |
| Isocyanate 4 |  |  |  |  | 27.06 |  |  |
| Isocyanate 7 |  |  |  |  |  |  | 7.26 |
| Index | 105 | 87 | 87 | 87 | 87 | 87 | 87 |
| Density (g/l) of moulded part | 55 | 55 | 55 | 55 | 55 | 55 | 64 |
| BS 5852 Crib V Weight loss (g) | Passed: 49 | Passed: 32 | Passed: 53 | Passed: 27 | Passed: 37 | Passed 47 | Passed: 43 |

Table 3:
  The foams according to the invention passed the flammability test.

TABLE 3

Flammability test to BS 5852, Part 2, Crib Ignition Source V

|  | Example 14 | Example 15 | Example 16 | Example 17 | Example 18 | Example 19 | Example 20 |
|---|---|---|---|---|---|---|---|
| POLYOL FORMULAT | | | | | | | |
| Polyol A | 70 | 100 | 70 | 70 | 100 | 70 | 100 |
| Polyol D |  |  | 30 | 30 |  | 30 |  |
| Polyol E | 30 |  |  |  |  |  |  |
| TCPP | 20 | 10 | 20 | 20 | 20 | 15 | 15 |
| Water | 3.35 | 3.5 | 3.35 | 2.85 | 3.0 | 3.35 | 3.5 |
| A1 | 0.05 | 0.05 | 0.05 | 0.05 | 0.05 | 0.05 | 0.05 |
| DMAPA | 0.3 | 0.3 | 0.3 | 0.3 | 0.3 | 0.3 | 0.3 |
| 33 LV | 0.5 | 0.3 | 0.3 | 0.4 | 0.3 | 0.3 | 0.3 |
| L 3100 | 0.7 | 0.7 | 0.7 | 0.7 | 0.7 | 0.7 | 0.7 |
| L 3002 | 0.5 | 0.5 | 0.5 | 0.5 | 0.5 | 0.5 | 0.5 |

TABLE 3-continued

Flammability test to BS 5852, Part 2, Crib Ignition Source V

|  | Example 14 | Example 15 | Example 16 | Example 17 | Example 18 | Example 19 | Example 20 |
|---|---|---|---|---|---|---|---|
| Glycerol | 0.3 | 0.3 | 0.3 | 0.3 | 0.3 | 0.3 | 0.3 |
| Isocyanate 1 | 28.56 |  |  | 20.36 | 24.62 |  |  |
| Isocyanate 2 | 7.14 | 7.14 | 7.14 | 13.57 |  |  |  |
| Isocyanate 3 |  |  |  |  |  |  | 33.28 |
| Isocyanate 5 |  | 28.56 | 28.56 |  |  | 29.44 |  |
| Isocyanate 6 |  |  |  |  | 16.42 |  |  |
| Isocyanate 8 |  |  |  |  |  | 7.36 | 8.32 |
| Index | 86 | 83 | 87 | 87 | 95 | 88 | 87 |
| Density (g/l) of moulded part | 53 | 55 | 55 | 53 | 70 | 55 | 55 |
| BS 5852 Crib V | Passed: | Passed: | Passed: | Passed: | Passed: | Passed | Passed: |
| Weight loss (g) | 25 | 26 | 43 | 53 | 25 | 27 | 30 |

Table 4:

The foams according to the invention with the use of EO-rich polyethers passed the flammability test.

TABLE 4

Flammability test to BS 5852, Part 2, Crib Ignition Source V

|  |  | Example 21 | Example 22 |
|---|---|---|---|
| POLYOL FORMULATION | Polyol A | 80 | 80 |
|  | Polyol D | 10 | 10 |
|  | Polyol F | 10 |  |
|  | Polyol G |  | 10 |
|  | TCPP | 20 | 20 |
|  | Water | 3 | 3 |
|  | A1 | 0.05 | 0.05 |
|  | DMAPA | 0.3 | 0.3 |
|  | 33 LV | 0.6 | 0.4 |
|  | L 3100 | 0.7 | 0.7 |
|  | L 3002 | 0.5 | 0.5 |
|  | Glycerol | 0.3 | 0.3 |
|  | Isocyanate 1 | 26.1 | 26.3 |
|  | Isocyanate 2 | 6.5 | 6.6 |
|  | Index | 85 | 86 |
|  | Density (g/l) of moulded part | 60 | 60 |
|  | BS 5852, Crib V, | Passed: | Passed: |
|  | weight loss (g) | 45 | 38 |

Table 5:

The foams according to the invention passed the flammability test even when no other liquid flame retardants were used (Example 23).

TABLE 5

Paper cushion test to DIN 54341 and UIC 564/2

|  | Example 23 | Example 24 | Example 25 | Example 26 | Example 27 | Example 28 | Example 29 | Example 30 |
|---|---|---|---|---|---|---|---|---|
| POLYOL FORMULAT |  |  |  |  |  |  |  |  |
| Polyol A | 100 | 100 | 100 | 100 | 100 | 100 | 100 | 100 |
| TCPP | 0 | 5 | 5 | 5 | 5 | 5 | 5 | 5 |
| Water | 3 | 3 | 3 | 3 | 3 | 3 | 3 | 3 |
| A1 | 0.05 | 0.05 | 0.05 | 0.05 | 0.05 | 0.05 | 0.05 | 0.05 |
| DMAPA | 0.3 | 0.3 | 0.3 | 0.3 | 0.3 | 0.3 | 0.3 | 0.3 |
| 33 LV | 0.3 | 0.3 | 0.3 | 0.3 | 0.3 | 0.3 | 0.3 | 0.3 |
| L 3100 | 0.5 | 0.7 | 0.7 | 0.7 | 0.7 | 0.7 | 0.7 | 0.7 |
| L 3002 | 0.5 | 0.5 | 0.5 | 0.5 | 0.5 | 0.5 | 0.5 | 0.5 |
| Glycerol | 0.3 | 0.3 | 0.3 | 0.3 | 0.3 | 0.3 | 0.3 | 0.3 |
| Isocyanate 1 |  |  |  |  |  | 13.5 | 15.3 | 17.1 |
| Isocyanate 2 | 3.1 | 3.1 | 3.1 | 3.4 | 3.4 | 1.5 | 1.6 | 1.8 |
| Isocyanate 3 |  |  |  |  |  | 13.5 | 15.3 | 17.1 |
| Isocyanate 5 | 27.7 | 27.7 | 27.7 | 31 | 31 |  |  |  |
| Index | 85 | 85 | 85 | 95 | 95 | 75 | 85 | 95 |
| Density (g/l) of moulded part | 65 | 65 | 55 | 65 | 55 | 65 | 65 | 65 |
| DIN 54341 | Passed | Passed | Passed | Passed | Passed | Passed | Passed | Passed |
| UIC 564/2 | Passed | Passed | Passed | Passed | Passed | Passed | Passed | Passed |

Table 6:

The foam according to the invention (Example 23) yields more favourable values for smoke density and toxicity than comparison example 31.

TABLE 6

Smoke density and toxicity according to NF-F 16101

|  |  | Example 23 | Example 31 |
|---|---|---|---|
| POLYOL FORMULATION | Polyol A | 100 | 14.05 |
|  | Polyol D |  | 79.66 |
|  | Polyol F |  | 1.87 |
|  | TCPP |  | 2.59 |
|  | Melamine |  | 33 |
|  | Water | 3 | 2.78 |
|  | A1 | 0.05 | 0.05 |
|  | DMAPA | 0.3 | 0.37 |
|  | 33 LV | 0.3 | 0.09 |
|  | B 4690 |  | 0.47 |
|  | L 3100 | 0.5 |  |
|  | L 3002 | 0.5 |  |
|  | 2-Ethylhexanoic acid |  | 0.14 |
|  | Glycerol | 0.3 | 0.64 |
|  | Isocyanate 2 | 3.1 |  |
|  | Isocyanate 3 |  | 25.9 |
|  | Isocyanate 5 | 27.7 |  |
|  | Index | 85 | 92 |
|  | Density (g/l) of moulded part | 65 | 70 |
|  | Class | F2 | F3 |

What is claimed is:

1. A high resilience cold-cure foam, comprising the reaction product of:
   a) an isocyanate component comprising a mixture of TDI and MDI in the weight ratio of 95:5 to 60:40, with
   b) one or more dispersions of polymers comprising relatively high molecular weight hydroxyl compounds which comprise the reaction product of:
      (i) one or more mono- and/or polyisocyanates, with
      (ii) at least one compound having primary and/or secondary amino groups, said compound being selected from the group consisting of polyamines, hydrazines, hydrazides and alkanolamines,
   in a polyether having 1 to 8 primary and/or secondary hydroxyl groups with a number-average molecular weight from 400 to 16,000, in the presence of
   c) one or more chemical and/or physical blowing agents, and, optionally, one or more of:
   d) one or more flame retardants which are liquid and/or soluble in a), b) or c),
   e) one or more compounds with at least two hydrogen atoms which are reactive towards isocyanates and with a molecular weight from 32 to 399, and
   f) further auxiliaries.

2. A process for the preparation of a high resilience cold-cure foam comprising:
   (1) reacting
      a) an isocyanate component comprising a mixture of TDI and MDI in a weight ratio of 95:5 to 60:40,
   with
      b) one or more dispersions of polymers comprising relatively high molecular weight hydroxyl compounds which comprise the reaction product of:
         (i) one or more mono- and/or polyisocyanates, with
         (ii) at least one compound having primary and/or secondary amino groups, said compound being selected from the group consisting of polyamines, hydrazines, hydrazides and alkanolamines,
      in a polyether having 1 to 8 primary and/or secondary hydroxyl groups with a number-average molecular weight from 400 to 16,000,
   in the presence of
      c) one or more chemical and/or physical blowing agents, and optionally, one or more of
      d) one or more flame retardants which are liquid and/or soluble in a), b) or c),
      e) one or more compounds with at least two hydrogen atoms which are reactive towards isocyanates and with a molecular weight from 32 to 399, and
      f) further auxiliaries.

3. The process of claim 2, wherein a) said isocyanate component comprising a mixture of TDI and MDI or a component thereof is reacted with a portion of component b) to form a prepolymer, and said prepolymer is then reacted with the remainder of component b), component c), and optionally, one or more of components d), e) and f), to form the high resilience cold-cure foam.

4. The process of c) said blowing agent comprises water.

5. The high resilience cold-cure foam of claim 1, wherein c) comprises water.

* * * * *